(12) United States Patent
Obara et al.

(10) Patent No.: US 6,290,394 B1
(45) Date of Patent: Sep. 18, 2001

(54) LINEAR MOTION GUIDE UNIT WITH LUBRICATING MEANS

(75) Inventors: Kouji Obara, Kanagawa; Yukio Yoshioka, Tokyo, both of (JP)

(73) Assignee: Nippon Thompson Co., Ltd., Tokyo (JP)

( * ) Notice: Subject to any disclaimer, the term of this patent is extended or adjusted under 35 U.S.C. 154(b) by 0 days.

(21) Appl. No.: 09/413,749

(22) Filed: Oct. 6, 1999

(30) Foreign Application Priority Data

Nov. 6, 1998 (JP) .................................................. 10-316610

(51) Int. Cl.$^7$ ...................................................... F16C 29/04
(52) U.S. Cl. ................................................. 384/13; 384/45
(58) Field of Search ................................... 384/13, 15, 45

(56) References Cited

U.S. PATENT DOCUMENTS

| | | | | |
|---|---|---|---|---|
| 4,582,369 | * | 4/1986 | Itoh | 384/13 |
| 6,024,490 | * | 2/2000 | Shirai | 384/13 |
| 6,082,899 | * | 7/2000 | Suzuki et al. | 384/13 |

FOREIGN PATENT DOCUMENTS

| | | | |
|---|---|---|---|
| 44 24 795 | * | 9/1995 | (DE) . |
| 44 15 704 | * | 11/1995 | (DE) . |
| 09-053637 | | 2/1997 | (JP) . |
| 10-19040 | * | 1/1998 | (JP) . |
| 10-78032 | * | 3/1998 | (JP) . |
| 10-205534 | | 8/1998 | (JP) . |
| 11-082507 | | 3/1999 | (JP) . |
| 11-093952 | | 4/1999 | (JP) . |

* cited by examiner

Primary Examiner—David A. Bucci
Assistant Examiner—William C Joyce
(74) Attorney, Agent, or Firm—Browdy and Neimark

(57) ABSTRACT

A linear motion guide unit in which rolling applicators transfer lubricant from a lubricant-containing member to raceway grooves on a track rail to make less sliding-friction resistance to a sliding element. The guide unit has a case accommodating therein the lubricant-containing member, and rolling applicators supported for rotation by a bearing member in the case. The lubricant held in the lubricant-containing member is applied onto the raceway grooves on the track rail through the rolling applicators, the peripheries of which are kept on sliding contact with the lubricant-containing member, thereby lubricating the confronting raceway grooves of the track rail and the sliding element, along which rolling elements run through in the sliding element. The frictional resistance that is encountered when the rolling element run through the track rail is the frictional resistance to rolling motion, which makes less the sliding resistance to the sliding element.

12 Claims, 9 Drawing Sheets

LINEAR MOTION GUIDE UNIT WITH LUBRICATING MEANS

BACKGROUND OF THE INVENTION

1. Field of the Invention

The present invention relates to a linear motion guide unit with lubricating means, which is applicable to industrial robots, semiconductor manufacturing apparatus, machine tools and the like to lubricate the relatively sliding parts and components.

2. Description of the Prior Art

The linear motion guide units have been conventionally used incorporated in the parts or components for reciprocating motion in fields as diverse as the industrial robots, semiconductor manufacturing machines, inspection instruments, machine tools or the like, and further developed to answer the needs for precision, high-speed, miniaturization or the like. The recently remarkable development in mechatronics technology extensively requires linear motion guide units that may meet with needs of maintenance-free, especially, the self-lubrication of long service life on its relatively movable sliding areas, along with miniaturization, high precision and high speed in operation.

FIG. 16 shows an example of prior linear motion guide units.

The linear motion guide unit in FIG. 16 is primarily comprised of a track rail 2 and a sliding element, or a slider 1, riding the track rail 2 astride for sliding movement. The track rail 2 is formed on lengthwise side surfaces 3 thereof with raceway grooves 4. The slider 1 may move on the track rail 2 by virtue of rolling elements running through the raceway groove 4. The track rail 1 has on lengthwise upper surface 14 thereof openings 13 spaced from each other. The track rail 2 is fixed to a mounting base 20 such as beds, working tables or the like by screwing bolts through the openings 13 of the track rail 2 and matching openings in the mounting base 20. The slider 1 has a casing 5 movable with respect to the track rail 2, and end caps 6 attached to the opposing ends of the casing 5. Provided on the upper surface of the casing 5 are openings 19 for fixture to mount other appliances, chucks, parts or the like on the slider 1.

Both the casing 5 and end caps 6 are made on the lower surfaces thereof with recesses 10, where the casing 5 and end caps 6 may sit astride the track rail 2 for free movement. The recesses 10 are each made with raceway grooves 9 in opposition to the raceway grooves 4 on the track rail 2. The rolling elements 7 contained in the casing 5 run through load areas of raceways defined between the confronting raceway grooves 4 and 9. Retainer bands 18 are provided in the casing 5 so as to embrace the rolling elements 7 to thereby prevent the rolling elements 7 from falling out of the casing 5. Bottom seals 8 are attached to the lower surfaces of the slider 1 to close clearances between the track rail 2 and the slider 1.

The end caps 6 are provided therein with members for scooping up the rolling elements 7 from the raceway grooves 4 on the track rail 2, and turnarounds for circulating the rolling elements 7. Mounted on the end caps 6 are end seals 17 for ensuring the sealing performance between the track rail 2 and the lengthwise opposing ends of slider 1. The end caps 6 are fixed to the opposing ends of the casing 5 by means of bolts 25, which are screwed into their matching holes. The raceways defined by the confronting raceway grooves 4, 9, turnarounds formed in the end caps 6 and return passages 12 formed in parallel with the raceway grooves 9 in the casing 5, in combination, constitute endless-circulating paths for the rolling elements 7. Even though the rolling elements 7 are under loaded condition in the raceways, rolling-contact of the rolling elements 7 with the raceway grooves 4, 9 may help ensure the smooth movement of the slider 1 relative of the track rail 2. Grease nipples 11 are connected to the end caps 6, passing through the end seals 17 to apply lubricant to the confronting raceway grooves 4, 9 where the rolling elements 7 run through.

To lubricate the raceways where the rolling elements 7 run through, grease or lubricating oil is usually employed. In case of grease, it is applied to the raceways through grease nipples 11. In contrast, lubricating oil is supplied to the raceways through pipe joints, which are used substituting for the grease nipples.

Japanese Patent Laid-Open No. 53637/1997, has disclosed a linear motion guide unit having for its object to provide a maintenance-free lubrication system for the raceways, in which a reinforcing plate, lubricant-containing member and side seal, overlapped one on the other, are fixed on the outward surface of an end cap mounted on a casing. The reinforcing plate is of a steel sheet having a substantially inverted U-shape, which is fit to the outward contour of the end cap, but does not come in contact with the track rail. The lubricant-containing member is provided on the inside thereof with convexities, which are formed in adaptation with the cross section of the track rail so as to come in sliding contact with the upper and side surfaces of the track rail. For constant supply of the lubricant from the lubricant-containing member to the raceway grooves, the lubricant-containing member is urged resiliently against the raceway grooves on the track rail by ring members fitted in holes formed in the lubricant-containing member, or resilient members adapted to the lubricant-containing member.

Japanese Patent Laid-Open No. 205534/1998, which is a senior co-pending application, discloses a linear motion guide unit comprising a track rail with raceway grooves and a slider movable along the track rail. The slider is composed of a casing provided with raceway grooves formed confronting the raceway grooves on the track rail, rolling element running through between the confronting raceway grooves, end caps fixed to the opposite ends of the casing, one to each end, lubricating plates affixed on the end surfaces of the end caps, and end seals attached onto the lubricating plates. The lubricating plate is of a sintered resinous component of porous structure and urged against the raceway grooves on the track rail by spring effect of resilient metal casing covering around the peripheries of the lubricating plate.

Moreover, the prior linear motion guide units with lubricating plate of other types have been developed and disclosed in, for example, Japanese Patent Laid-Open Nos. 82507/1999 and 93952/1999, which are senior co-pending applications. In the linear motion guide units cited above, the lubricating plate of the lubricant-containing member is directly urged against the raceway grooves on the track rail and, therefore, the lubricant-containing member moves in sliding engagement with the raceway grooves of the track rail as the slider moves with respect to the track rail. This raises a major problem in which the sliding friction due to the engagement of the lubricant-containing member with the raceway grooves causes much sliding resistance acting on the slider. As a result, it will be understood that the linear motion guide units with the lubricating plate constructed as cited above are unfit for the machines or apparatus to be operated at high speed, where the linear motion guide units incorporated is required to drive their sliders with high travelling speed.

In addition, most linear motion guide units are usually kept against the invasion of debris or dust by means of the end seals covering the end surfaces of the units, which are each composed of a rubber member of, for example, acrylonitrile-butadiene rubbers and a core metal. Nevertheless, the linear motion guide units have been recently employed in fields as diverse as conditions where the lubrication cannot be tolerated, and severe operating conditions, for example, where much debris and dust, chips or the like are apt to occur and adhere to the components or parts. With the environments where the linear motion guide units operate, consequently, the lubricant-containing member in the lubricating plate is susceptible to clogging up caused by the adhered debris so that there is a fear of obstructing the supply of lubricant. Moreover, direct contact of the lubricant-containing member in the lubricating plate with the raceway grooves of the track rail causes a major problem in which much area of sliding contact results in much consumption of lubricant.

SUMMARY OF THE INVENTION

The present invention has for its primary object to overcome the problems as described just above, on the basis of a characteristic where the friction resistance to the rolling motion is substantially smaller than to the sliding motion. The present invention especially provides a linear motion guide unit with lubricating means in which rolling members, moved in rolling contact with the raceway grooves on the track rail, has the function of applying lubricant to the raceway grooves, whereby the friction resistance encountered when the slider moves along the raceways on the track rail is made less and at the same time the confronting raceway grooves of the track rail and slider may be lubricated. In accordance with the lubricating means of the present invention, as the slider, likewise with the prior linear motion guide units, moves along the track rail, a lubricant-containing member in a lubricating plate may reliably apply the lubricant to the track rail, without being subjected to the friction resistance as large as that to the sliding motion.

The present invention is concerned with a linear motion guide unit comprising a track rail provided at lengthwise side surfaces thereof with first raceway grooves, a sliding element, or a slider, movable with relative to the track rail and having second raceway grooves confronting the first raceway grooves, and lubricating means arranged on the sliding element for lubricating the confronting first and second raceway grooves, wherein the lubricating means is comprised of a case arranged riding the track rail astride, a lubricant-containing member accommodated in the case, and rolling applicators supported for free rotation by bearing means in the case in such a manner as to come in contact with the lubricant-containing member while run through the raceway grooves on the track rail, whereby the rolling applicators transfer the lubricant from the lubricant-containing member to the first and second raceway grooves, resulting in lubricating the first and second raceway grooves.

In accordance with the present invention, as the slider moves along the track rail, the rolling applicators held for rotation in the case of the lubricating means run through the first raceway grooves on the track rail, revolving their own axes whereby the lubricant in the lubricant-containing member is applied on the peripheries of the rolling applicators kept in sliding contact with the lubricant-containing member. With the rolling applicators running through the first raceway grooves, the lubricant applied on the applicators is transferred to the first raceway grooves and then to the second raceway grooves thereby lubricating the first and second raceway grooves.

In an aspect of the present invention, a linear motion guide unit is disclosed wherein the bearing means for the rolling applicator has a pair of retainer arms arranged spaced apart from each other in a direction of thickness of the case, and a web connecting the retainer arms to one another. Thus, the rolling applicators are held for rotation in concavities, each of which is defined by the associated, paired retainer arms and connecting web. That is to say, the concavity holds the associated rolling applicator for rotation therein by engaging with the rolling applicator at its spherical areas opposite diametrically in the direction of the thickness of the case and also at another spherical area opposite diametrically to the raceway surface of the track rail.

In another aspect of the present invention, a linear motion guide unit is disclosed wherein the lubricating means is attached to the sliding element or a mount fixed to the slider so as to move in unison with the slider.

In another aspect of the present invention, a linear motion guide unit is disclosed wherein the slider includes a casing having the second raceway grooves, rolling elements running through between the confronting first and second raceway grooves, end caps attached to the opposite ends of the casing, and end seals arranged on the end caps. Mounted on the end surface of any one of the end caps is the case for the lubricating means, on the end surface of which is attached any one of the end seals.

In a further another aspect of the present invention, a linear motion guide unit is disclosed wherein the case is formed in a container that contains the lubricant-containing member in a lower area therein while the lubricant in an upper area therein. Although the lubricant in the lubricant-containing member is consumed as the linear motion guide unit operates, the lubricant-containing member may be replenished with the lubricant preserved in the upper area of the container. The lubricant may be supplied continuously until all the lubricant is used up, which is previously impregnated in the lubricant-containing member and stored in the container. Moreover, the container is made at a ceiling wall thereof with an admission port for replenishment of the lubricant and, therefore, another lubricant may be charged into the container through the admission port after the lubricant has been used up. The admission port also allows the atmospheric air to flow in the container depending on the consumption of the lubricant preserved in the container and, therefore, the container is never made the reduced pressure that might otherwise hinder the lubricant from flowing towards the raceway grooves on the track rail. The lubricant is of lubricating oil mixed with any one selected from powdery resins, pulverized metals and felts.

In another aspect of the present invention, a linear motion guide unit is disclosed wherein the case is composed of a frame that comprises an upper section, side sections extending downward from sidewise opposing ends of the upper section, and lower sections extending towards the track rail from the bottom ends of the side section, and wherein the lubricant-containing member fits in the frame. The case of framework described just above is not a container capable of storing the lubricant alone therein and, therefore, only the lubricant absorbed in the lubricant-containing member is permitted to use. In addition, the case is provided with an end plate that is integrally connected all the upper section, side sections and lower sections and extends in a plane crossing with the sliding direction of the sliding element to thereby cover any one end surface of the lubricant-containing member. According to this design, the end plate supports the lubricant-containing member at its any one surface so that the lubricant-containing member is kept reliably in the case. The lubricant-containing member may be loaded in or unloaded out of the case at the side left open.

In another aspect of the present invention, a linear motion guide unit is disclosed wherein windows are provided in any one of the upper section and the side sections of the case and the lubricant-containing member has partially raised surfaces that fit in the windows. Fitting the raised surfaces of the lubricant-containing member in the windows in the case helps ensure that the case holds the lubricant-containing member therein with reliability. Moreover, the lubricant-containing member may be replenished with the lubricant through the windows.

In a further another aspect of the present invention, a linear motion guide unit is disclosed wherein the case is provided with holes for a grease nipple or a lubricant-supply coupling connected to the end caps. Further, a linear motion guide unit is disclosed wherein the case is made of any one selected from metals, synthetic resins and synthetic rubbers.

In another aspect of the present invention, a linear motion guide unit is disclosed wherein the lubricant-containing member is made with concave surfaces where the rolling applicators come in sliding contact with the lubricant-containing member. The rolling applicators are of balls or rollers and, therefore, the rolling applicators revolve about their own axes, keeping the sliding contact with concave surfaces of the lubricant-containing member to thereby receive the lubricant at their peripheries. According to another aspect of the present invention, the lubricant-containing member is composed of lubricant-containing halves that are kept on sliding contact with the rolling applicators, one to each half, which run through the first raceway grooves extending along the lengthwise side surfaces on the track rail. The lubricant-containing halves are arranged in symmetry on opposite sides of the track rail. On the design the lubricant-containing member is divided into halves, only the lubricant-containing halves identical in shape and pattern may be necessary so that their production cost is made reduced. The lubricant-containing member is of a porous sintered resinous component that is produced by heating finely powdered synthetic resin of ultrahigh molecular weight polymers under pressure in a design mould.

In accordance with the linear motion guide unit constructed as described above, there is provided the lubricating means having the lubricant-containing member held in the case or supporting member, and the rolling applicators arranged in sliding contact with the raceway grooves on the track rail. The rolling applicators also come in sliding contact with the lubricant-containing member, which is made of a sintered porous resinous component of ultrahigh molecular weight polymers. The case is provided with bearing means to hold the rolling applicators in such a manner as to permit the rolling applicators to rotate, keeping the sliding contact with the raceway grooves on the track rail. As the slider moves along the track rail, thus, the lubricant is transferred smoothly from the lubricant-containing member onto the peripheries of the rolling applicators, where the lubricant is then applied to the raceway grooves on the track rail so that the lubricant may be applied little by little to the raceway grooves to thereby help ensure the reliable lubrication with no fear of lubrication failure. Moreover, the frictional sliding resistance due to the lubricating means, which is encountered when the slider moves along the track rail, may be advantageously made reduced and, therefore, little wear occurs.

In the lubricating means constructed as described above, all the lubricant-containing member and rolling applicators are handled encapsulated in the case and, therefore, the handling operations such as assembly to and disassembly of the lubricating means together with end caps and end seals to the casing and the preservation thereof may become simple. The lubricant and lubricant-containing member to be encapsulated in the case are combined such that they are comfortable with each other in a condition where the lubricant soaks into the sintered porous resinous component. Moreover, the lubricant to be charged in the lubricating means is selected by the user, rechargeable and easy to handle and to modify in specification.

The lubricating means constructed as described above may be used incorporated in most presently available linear motion guide units with no need of changing basic specifications. Namely, the lubricating means of this invention may be universally adapted to the diverse types of the linear motion guide units, which differ, for example, in size or shape of the sliders incorporated, as long as the track rail is identical in its industrial standard. Moreover, the lubricating means may be easily attached to any slider of the linear motion guide unit by only sitting the track rail astride, which has been under operation for machining, thereby contributing to improving the self-lubrication of the linear motion guide units.

Moreover, the linear motion guide unit of the present invention makes possible the self-lubrication even under the severe operating conditions, thereby achieving the long-lasting lubrication, improving in dustproof to the lubricating system by the case to thereby keep the clean environment, and resulting in achieving the maintenance-free in operation.

Other objects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

Figure 1:
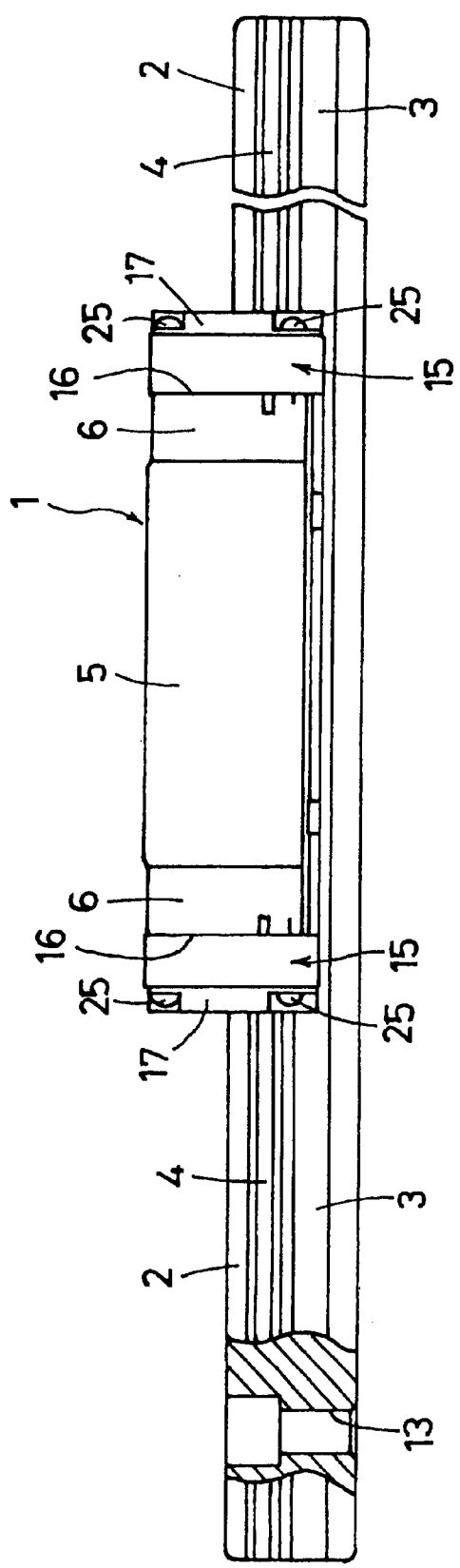
FIG. 1 is a side elevation showing a preferred embodiment of a linear motion guide unit according to the present invention.

Referring now in detail to the drawings, the linear motion guide unit according to the present invention will be explained below. In FIGS. 1 to 8 showing the first embodiment of the present invention, the same reference characters are assigned to the parts and components identical in structure and in function, compared with the prior linear motion guide unit in FIG. 16.

Figure 2:
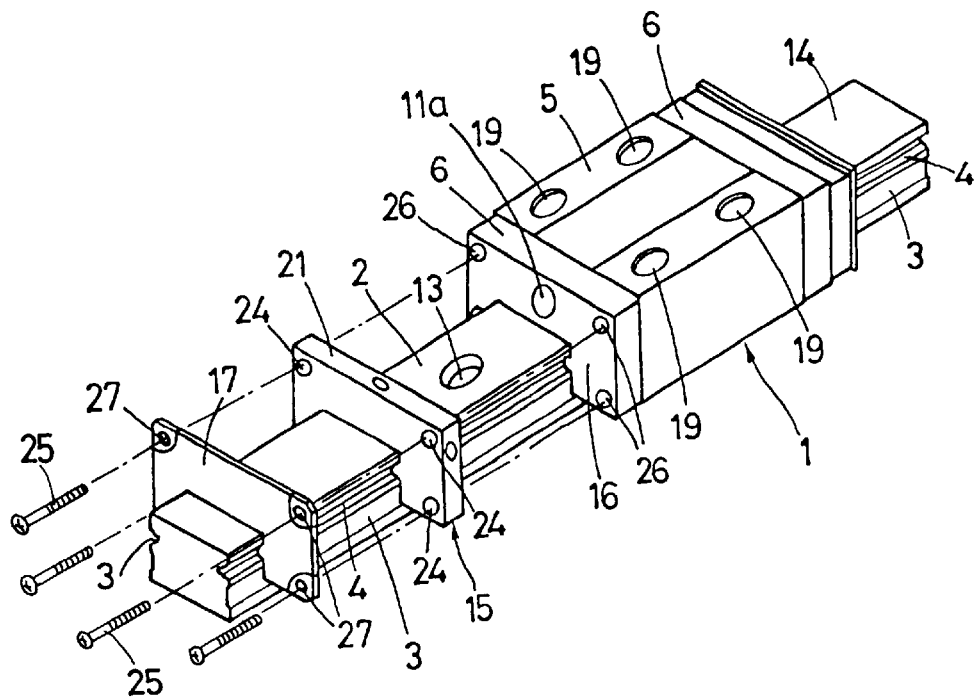
FIG. 2 is an exploded perspective view of the linear motion guide unit shown in FIG. 1.
Figure 3:
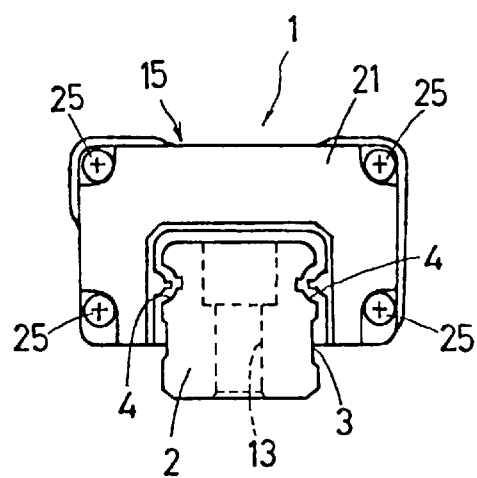
FIG. 3 is a front elevation of the linear motion guide unit in FIGS. 1.
Figure 4:
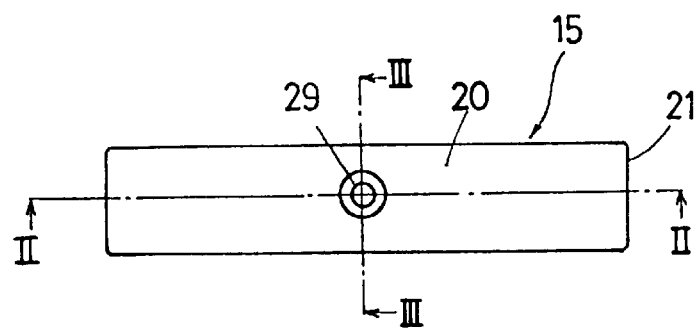
FIG. 4 is a top plan view showing a lubricating means to be incorporated to the linear motion guide unit shown in FIG. 1.
Figure 5:
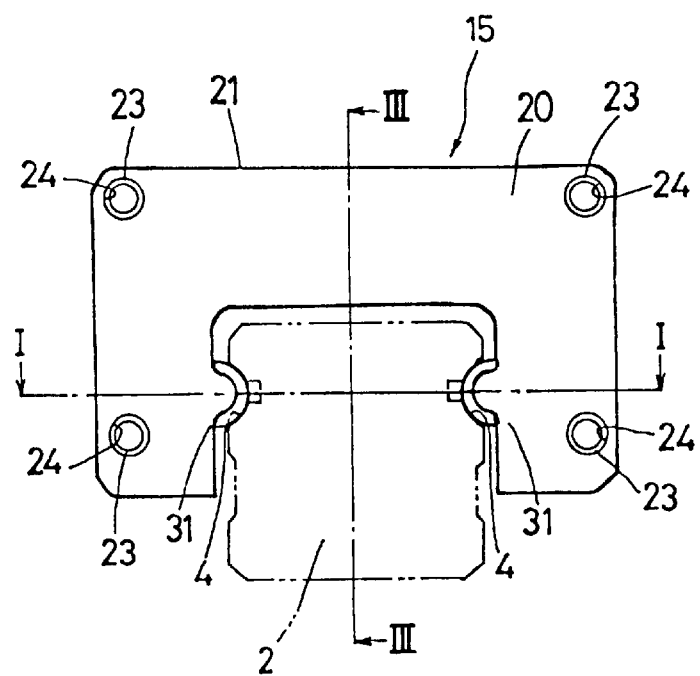
FIG. 5 is a front elevation of the lubricating means in FIG. 4.
Figure 6:
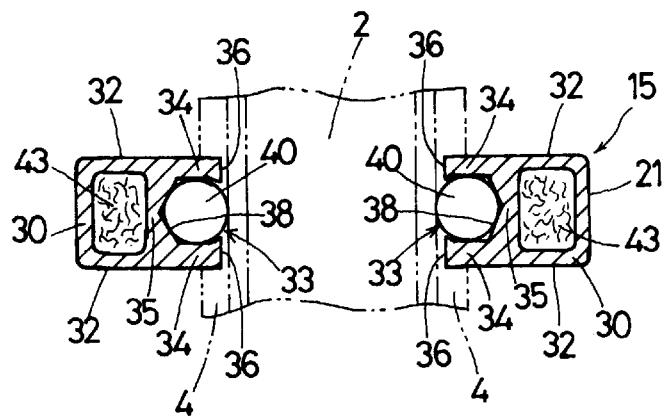
FIG. 6 is a sectional view of the lubricating means and is taken along the line I—I of FIG. 5.

As shown in FIGS. 1 to 3, the first embodiment of the present invention is identical in structure with the prior linear motion guide unit, except for lubricating means 15 and, therefore, like parts or components have be rotate, keeping the sliding contact with the raceway grooves on the track rail. As the slider moves along the track rail, thus, the lubricant is transferred smoothly from the lubricant-containing member onto the peripheries of the rolling applicators, where the lubricant is then applied to the raceway grooves on the track rail so thahe first raceway grooves 4 are each formed in arced recess in cross section on the opposed lengthwise side surfaces 3 of the track rail 2. The slider 1 includes therein the casing 5 and end caps 6 that are fixed to the opposing ends of the casing 5. Likewise with the prior unit shown in FIG. 16, the slider 1 and track rail 2 are also bored at 13 and 19 for bolts to connect the unit to a table or other mounts.

Figure 16:
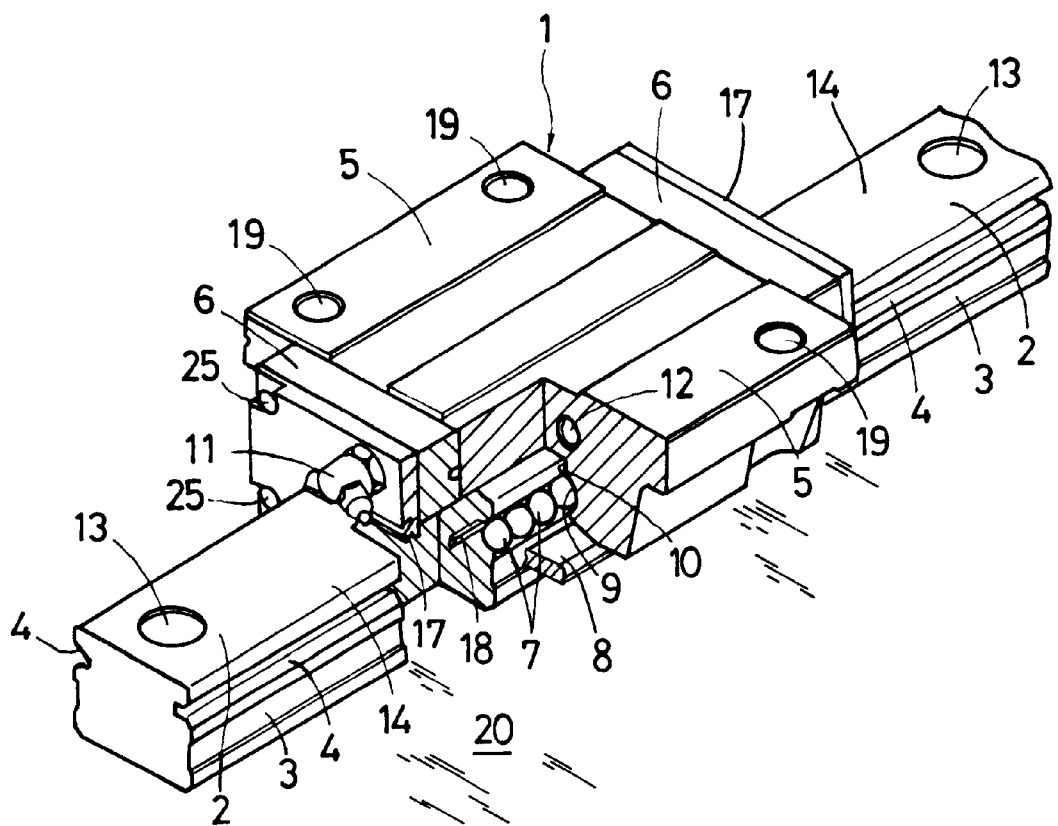
FIG. 16 is a perspective view, partially broken away, of a conventional linear motion guide unit.

The casing 5 is identical in structure with that of the prior slider shown in FIG. 16 and provided therein with raceway grooves, or second raceway grooves 9. The slider 1 may move smoothly along the track rail 2 by virtue of the rolling elements 7 that run through between the confronting raceway grooves 4, 9. The casing 5 is also provided with retainer bands 18 and the bottom seals 8. The rolling elements 7 may run through endless-circulating paths that comprise the load areas of the raceways, the turnarounds in the end caps 6 and the non-loaded return passages 12 in the casing 5.

Affixed on the end surfaces of the end caps 6 are lubricating means 15, illustrated in detail in FIGS. 4 to 8, which ride astride the track rail 2 for sliding movement along the track rail 2. In order to affix the lubricating means 15 on the end surfaces of the end caps 6 connected to the lengthwise opposing ends of the casing 5, a case 21 for the lubricating means 15 is made reinforced at four corners 22 thereof, where there are bored holes 24 through which clamping bolts 25 extend to connect the lubricating means 25 to any one lengthwise end of a casing 5. In alignment with the holes 24 bored in the lubricating means 15, matching holes 26, 27 for the clamping bolts 25 are made in the end caps 6 and end seals 17, which are arranged in such a relation as to clamp the lubricating means 15 between them. When the clamping bolts 25 fit into threaded holes in the casing 5 of the slider 1 after extending through the matching holes 27, 24 and 26 of the end seal 17, case 21 and end cap 6, respectively, all the end seal 17, case 21 and end cap 6 are attached on the slider 1 in such a relation that the case 21 is clamped between the end seal 17 and the end cap 6. Where the case 21 is made of synthetic resins, it is preferred to fit collars 23 in the matching holes 24 in such a manner that the collars 23 come in abutment at their opposing ends against the end cap 6 and the end seal 17 thereby protecting the case 21 against the compressive forces by the clamping bolts when tightened.

Figure 7:
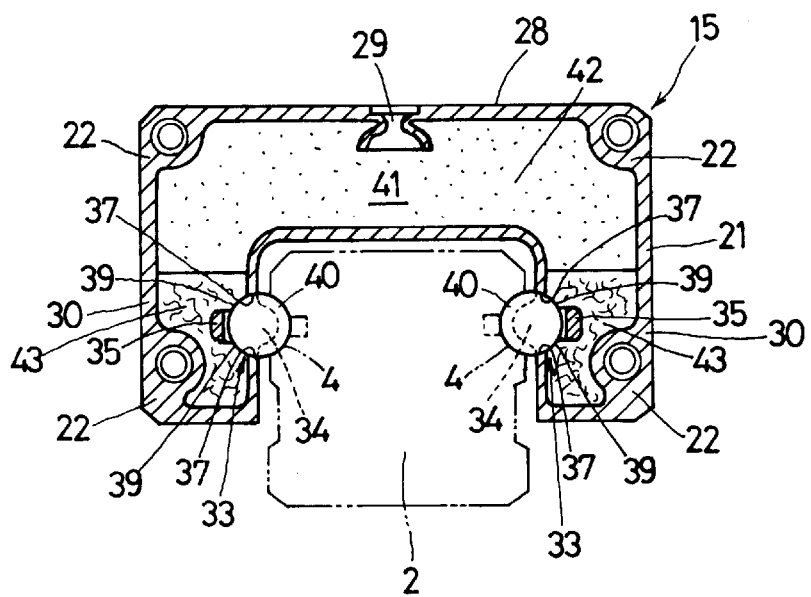
FIG. 7 is a sectional view of the lubricating means and is taken along the line II—II of FIG. 4.
Figure 8:
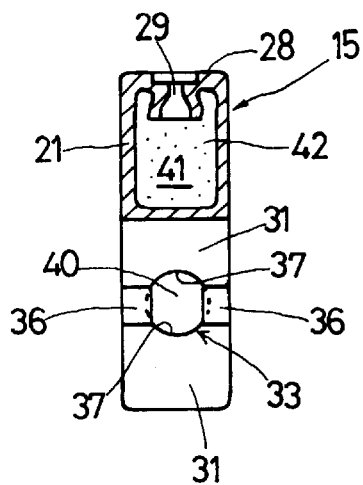
FIG. 8 is a sectional view of the lubricating means and is taken along the line III—III of FIGS. 4 and 5.

The case 21 is a container that is thin in thickness and has the contour substantially resembling a gate. The container may be made of any one selected from metals, synthetic resins and synthetic rubbers. The case 21 for the lubricating means 15, as shown in particular in FIG. 7, is formed in a briefcase-like container to accommodate therein a lubricant-containing member 43, which will be in detail described hereinafter, and also conserve lubricant such as lubricating oil and grease. The case 21 is made at a ceiling wall 28 thereof with an admission port 29 through which the lubricant may be charged into the case 21. It will be noted that the admission port 29 allows the atmospheric air to flow in the case 21 depending on the consumption of the lubricant. As an alternative, the admission port 29 may be provided at any area other than the ceiling wall 28 of the case 21, for example, at an upper area of any side section 30. The case 21 may be easily fabricated by joining together halves that have been previously prepared in the form taken along the line II—II of FIG. 4. On this design, the lubricant-containing member 43 is arranged prior to joining the halves together, whereas the lubricant is charged in the container through the admission port 29 after the halves have been joined together.

Rolling applicators 40, or balls, are held for rotation in applicator retainers 33 provided in inward side-walls 31, which constitute partly the widthwise-opposing side sections 30 of the case 21. The rolling applicators 40 are held in the case 21 in such a manner that the rolling applicators 40 are partially exposed facing the associated raceway groove 4 on the track rail 2 so as to come in rolling contact with the raceway groove 4. Each applicator retainer 33 is composed of a pair of retainer arms 34 formed spaced away from each other along the thickness of the case 21, and a web 35 connecting a pair of frontward and backside walls 32, 32 of the case 21 to each other along the rolling applicators 40 at the side radially opposite to the exposed area of any rolling applicator 40. The retainer arms 34 stretch from the paired frontward and backside walls 32, 32 toward the track rail 2 to the extent where distal ends of the retainer arms 34 are slightly over the diametral plane of any rolling applicator 40. The distal ends of the retainer arms 34 are formed in claws 36 to embrace the rolling applicators between them. The rolling applicators 40 are received in concavities 38 defined by the paired confronting retainer arms 34 and the connecting web 35. The rolling applicators 40 are certainly embraced by caulking the claws 36 formed at the distal ends of the retainer arms 34 whereby the rolling applicators 40 are kept from falling off the concavities 38. The applicator retainers 33, moreover, have arced margins 37 opposing in the direction of height of the side sections 30 to provide circular openings, which are each smaller in size than the diameter of the associated rolling applicator 40 thereby preventing the rolling applicator 40, having been received in the concavity 38, against falling off the concavity 38 along the direction of height of the side section 30.

The rolling applicators 40 confined in the concavities 38 are exposed to the interior of the case 21 through slits 39 provided between the margins 37 and the connecting web 35. Accommodated in an interior space 41 of the case 21 are lubricant 42 at the upper area of the interior space 41, which is charged through the admission port 29, and lubricant-containing members 43 at the lower areas of the interior space 41. Each lubricant-containing member 43 is of the amount as much as capable of absorbing the lubricant 42 reserved in the space 41 and also oozing the proper amount of the absorbed lubricant 42. Areas left unoccupied with the lubricant-containing members 43 serve as tanks for reserving the lubricant. The lubricant-containing members 43 are facing the rolling applicators 40 at the slits 39 so as to come in contact with the rolling applicators 40 through the slits 39. As the rolling applicators 40 rotate with keeping the sliding contact with the lubricant-containing members 43, the lubricant in the lubricant-containing members 43 may be transferred to the peripheries of the rolling applicators 40, which are thus supplied with the lubricant. Consequently the lubricant-containing members 43 have for their function to lead the lubricant, stored in the interior space 41 of the case 21, to the peripheries of the rolling applicators 40.

The case 21 may be charged with lubricant, either alone or mixed with any adjunctive agent. The lubricant to be charged alone is, for example, lubricating oil or grease. On the other hand, it is to be noted that the grease of high viscosity is undesired because of difficult permeation of the lubricant in the lubricant-containing member 43. It is thus preferred to employ the grease low in consistency, for example, lithium grease.

The lubricant-containing member 43 is of a sintered resinous component, or sintered porous body of high molecular polymers, having a porous structure including continuous voids therein. The sintered resinous component having a porous structure of continuous voids is produced by filling a preselected mould with the powdery ultrahigh molecular weight polyethylene resin having the grading of, for example, either fine grain size of 30 $\mu$m or coarse grain size of from 250 $\mu$m to 300 $\mu$m, and then heating the molded resin under high pressure. The sintered resinous component of porous structure has the function of oozing little by little and smoothly the lubricant that has been stored in the voids of the sintered component. The sintered resinous component is fabricated by pressing the fine powder of synthetic resins in the mould under high temperature and, therefore, it is superior in workability and wear-proof and further it may be produced inexpensively. A porous sintered body of high polymers is a typical example of the sintered resinous component suitable for embodying this invention. The sintered resinous component for the lubricant-containing member 43 preferably has the porous structure of the porosity of, for example, from 40% to 50%.

The lubricant-containing member 43, further, is prepared by immersing the porous sintered resinous component with turbine oil for the lubricating oil thereby impregnating the voids with the lubricating oil. Dipping the sintered resinous component into, for example, turbine oil for about 30 minutes may provides the lubricant-containing member 43 that is regulated at percentage of lubricating oil content of 41% by weight and thus at oil content of about 2 cc. Percentage of lubricating oil content may be controlled in accordance with the operating condition of the slider 1. Preferable combination of the lubricant and the sintered resinous component to prepare the desired lubricant-containing members 43 may be selected from materials other than that described just above and, thus, the modification in specification may be allowed with relative ease. The sintered resinous component for the lubricant-containing member 43 may be easily formed with high accuracy of finishing within, for example, about ±0.025 mm. This makes it possible to provide the component that is most suitable for the linear motion guide units incorporated into the precision machines.

With the track rail 2 having mounted with the slider 1 having the lubricating means 15, the rolling applicators 33 held in the applicator retainers 33 are brought into contact with the raceway grooves 4 of the track rail 2 at the areas thereof, which are exposed out of the case 21 to the raceway grooves 4. The raceway grooves 4 on the track rail 2 are made to have the arced cross section so that the retainer arms 34, 34 do not come in contact with the raceway grooves 4, but extend into the grooves of arced cross section.

As the slider 1 moves along the track rail 2, the lubricant charged in the interior space 41 of the case 21, or grease, lubricating oil or oily substance contained in powdery resins, is transferred incessantly to the peripheries of the rolling applicators 40 from the lubricant-containing members 43 through slots 39. With the rolling applicators 40 running along the raceway grooves 4 on the track rail 2, on the other hand, the lubricant 42 on the peripheries of the rolling applicators 40 is applied little by little to the raceway grooves 4 on the track rail 2. The lubricant applied onto the raceway grooves 4 spreads therefrom over the rolling elements 7 and the raceway grooves 9 in the slider 1 to help ensure the smooth run of the rolling elements 7 whereby the slider 1 can make the smooth sliding movement along the track rail 2. When the lubricant 42 in the case 21 has been used up completely, only replenishing another lubricant in the case 21 through the admission port 29 may be sufficient for ready-to-restart. With the exception of the replenishment of the lubricant, thus, the linear motion guide unit of the present invention will operate with maintenance-free.

Figure 9:
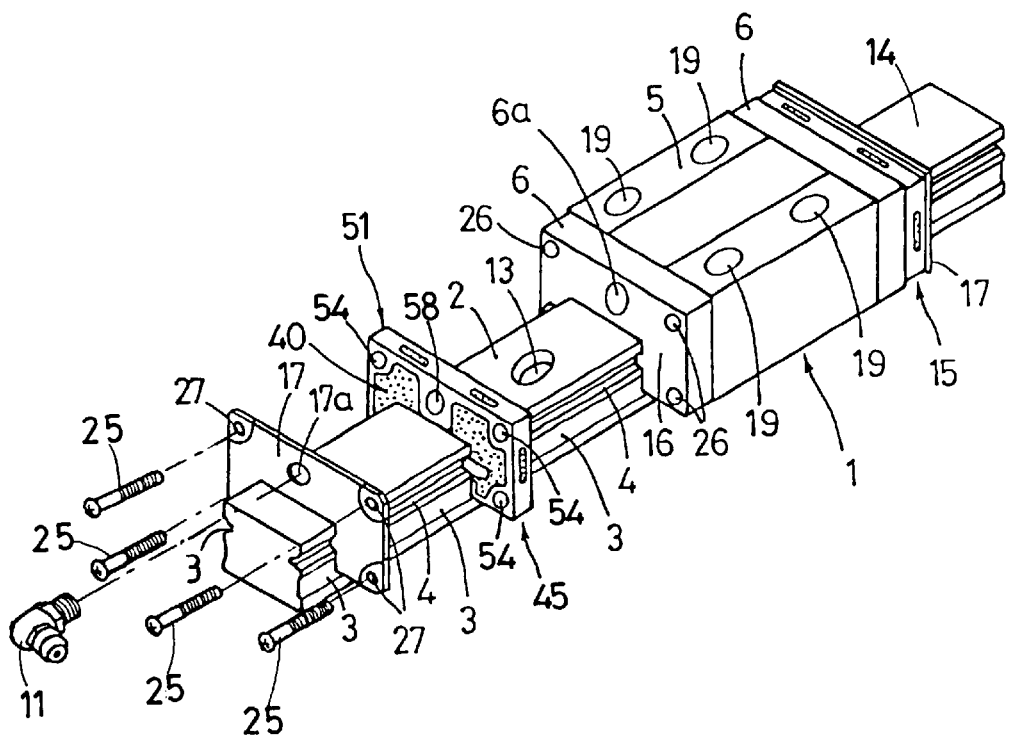
FIG. 9 is an exploded perspective view showing another embodiment of the linear motion guide unit according to the present invention.
Figure 10:
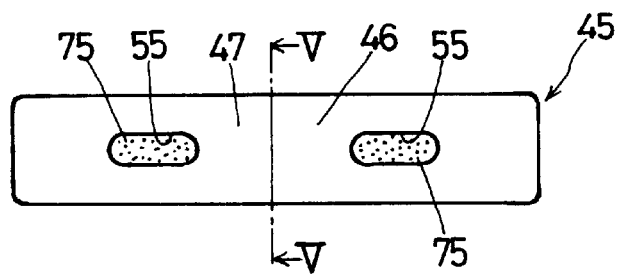
FIG. 10 is a top plan view showing a lubricating means to be incorporated to the linear motion guide unit shown in FIG. 9.
Figure 11:
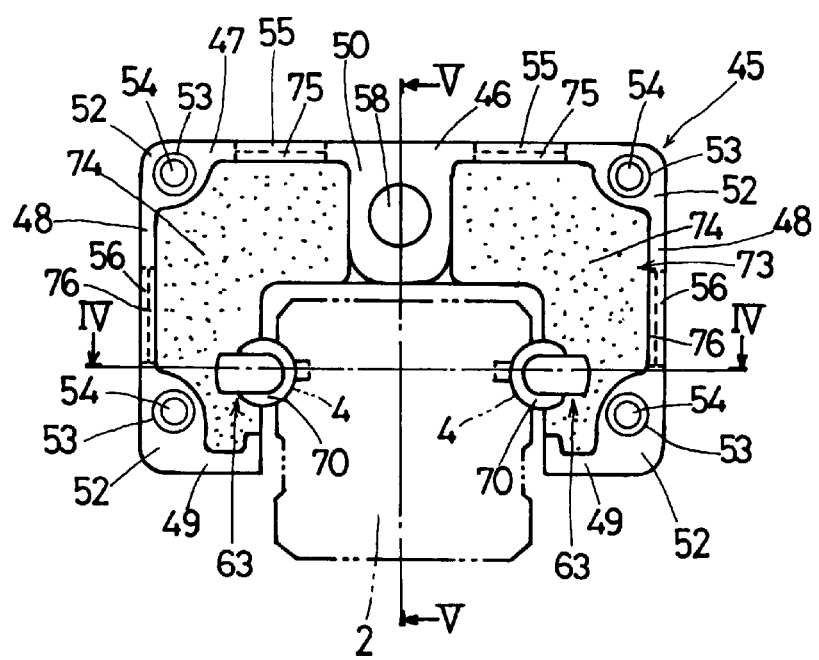
FIG. 11 is a front elevation of the lubricating means in FIG. 10.
Figure 12:
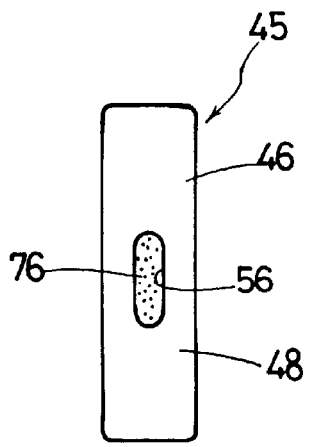
FIG. 12 is a side elevation of the lubricating means in FIG. 10.
Figure 13:
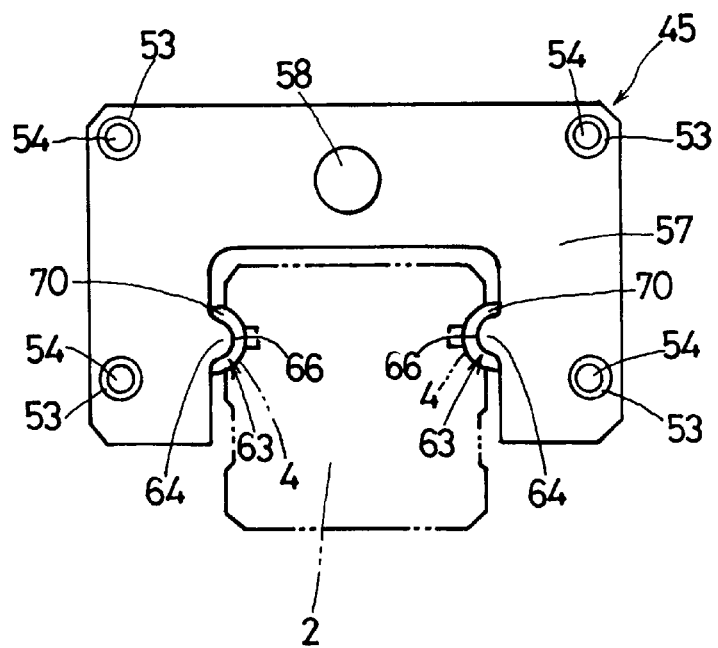
FIG. 13 is a back front view of the lubricating means in FIG. 11.
Figure 14:
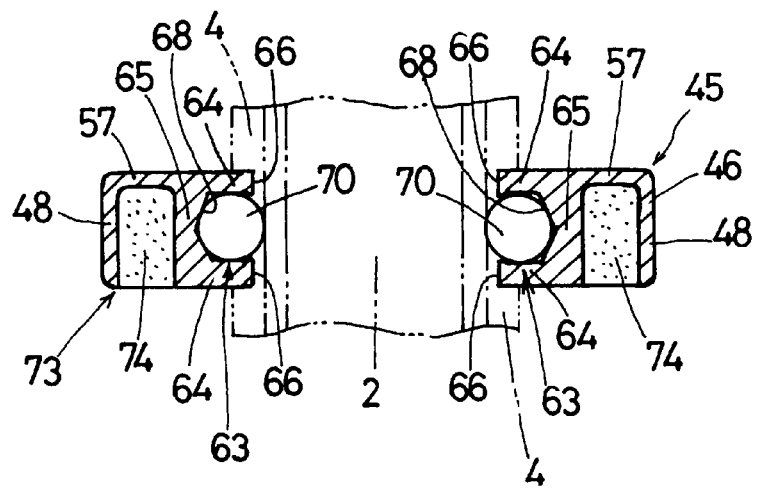
FIG. 14 is a sectional view of the lubricating means and is taken along the line IV—IV of FIG. 11.
Figure 15:
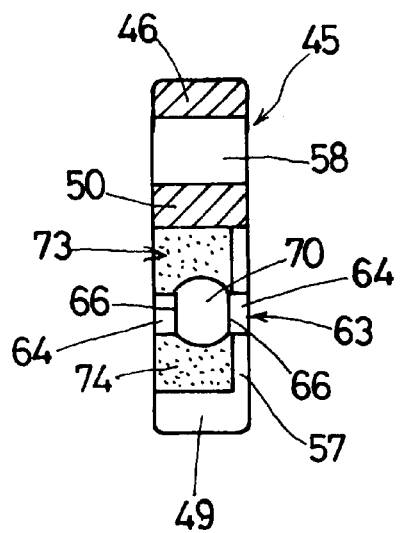
FIG. 15 is a sectional view of the lubricating means and is taken along the line V—V of FIGS. 10 and 11.

Another embodiment of the linear motion guide unit according to the present invention will be described hereinafter in conjunction with FIGS. 9 and 15, where like reference numerals designate parts and components identical in structure and function with that in FIGS. 1 to 8, so that the previous description will be applicable.

In this second embodiment of the present invention, another lubricating means 45 is mounted on the end surface 16 of any one of the end caps 6. The lubricating means 45 includes a case 46, a lubricant-containing member 73 supported in the case 46, and rolling applicators 70 supplied with the lubricant from the lubricant-containing member 73 and kept in rolling contact with the track rail 2. The lubricant-containing member 75 is of a platy-body uniform in thickness and formed in a substantially inverted U-shape matching an end contour of the casing 5. Thus, the lubricant-containing member 75 may sit astride the track rail 2 at its U-shaped recess. The end seal 17 is arranged on the end surface of the lubricating means 45 for sliding movement along the track rail 2. The case 46 has the contour substantially resembling a gate, which is composed of an upper horizontal section 47, a pair of side sections 48, 48 extending downward from the sidewise opposing ends of the upper section 47, and lower horizontal sections 49, 49 extending towards each other from the bottom ends of the side sections 48, 48.

In some cases, the lubricant-supply coupling, or grease nipple 11, is required to apply the lubricant or lubricating oil to the raceway grooves 4 from another source in addition to the lubricant supply from the lubricant-containing member 73. To cope with this, the case 46 has a design capable of mating with the grease nipple 11 likewise with the prior design. It is considered preferable that the grease nipple 11 is installed at the middle area of any one of the lengthwise opposing ends of the slider 1 and bored through any area of the case 46, which is relatively high in rigidity, for the sake of insuring mechanical strength. Thus, an opening 58 for fitting the grease nipple 11 therein, as apparent from FIG. 9, is bored through a middle area 50 of the upper horizontal section 47 in the case 46 in alignment with a hole 17a in the end seal 17. The middle area 50 where the opening 58 for the grease nipple 11 is a solid partition spreading from the upper horizontal section 47 of the case 46 towards the upper surface 14 of the track rail 2.

With the lubricating means 45 sitting astride the track rail 2, the upper horizontal section 47 is in parallel with the upper surface 14 of the track rail 2, the side sections 48, 48 paralleling the lengthwise side surfaces of the track rail 2 and the lower horizontal sections 49, 49 parallel the upper horizontal section 47 and extend towards the lengthwise side surfaces of the track rail 2. The case 46 surrounds around the lubricant-containing member 73 except a region facing the track rail 2. That is to say, the lubricant-containing member 73 is exposed to the confronting surfaces of the track rail 2 in the event where the slider 1 with the case 46 holding the lubricant-containing member 73 therein is arranged to sit astride the track rail 2. A lid 57 covers any one of end surfaces of the lubricant-containing member 73, which are opposite to each other with respect to the direction along which the slider 1 moves, that is, either the end surface facing the end cap 6 or the end surface facing the end seal 17.

Thus, although but the lubricant-containing member 73 before combined with the slider 1 is exposed to the atmosphere at its any one end surface, it is covered with any one of the end cap 6 and end seal 1 when attached to the slider 1. The lid 57 of the case 46, covering any end surface of the lubricant-containing member 73, has for its another function to prevent the lubricant-containing member 74 from falling off the case 47. The case 46 may be made of any one of metals, synthetic resins, synthetic rubbers or the like. As an alternative, a modified case 46 may be provided in which the lid 57 is taken away partially to tolerate the case 46 the resilient or restorable deformation when mounting the lubricating means 45 to the track rail 2 or slider 1, thereby making the lubricating means easy to handle. The modified case 46 may undergo the resilient deformation with no breakage, so that the lubricant-containing member 73 may be easily attached to or detached from the case 46 on assembling or dissembling the lubricating means 45. In consequence, this makes it possible to stretch sidewise only the lubricating means 45 astride the track rail 2, leaving casing 5, end caps 6 and end seals 17 on the track rail 2, whereby the lubricating means 45 may be attached to or detached from the track rail with ease.

Likewise with the first embodiment, the case 46 for the lubricating means 45 is made reinforced at four corners 52 thereof, where holes 54 are bored for the clamping bolts 25 to connect the lubricating means 45 with the casing 5 so as to come in abutment against any one of the end caps mounted to the lengthwise opposing ends of the slider 1. With the clamping bolts 25 being screwed into the threaded holes of the casing 5 in the slider 1 after passing through the matching holes 54 in the case 46 as well as the matching holes 26, 27 in the end cap 6 and end seal 17 clamping the case 46 between them, all the end seal 17, case 46 and end cap 6 are attached on the slider 1 in such a relation that the case 46 is clamped between the end seal 17 and the end cap 6. Where the case 21 is made of synthetic resins or synthetic rubbers, it is preferred to fit collars 53 in the matching holes 54 in such a manner that the collars 53 mostly sustain the compressive force applied by the clamping bolts 25, which are inserted through the collars 53 and tightened, to thereby protect the case 46 against the deformation that might otherwise happen due to the compressive force when tightened.

The lubricant-containing member 73 is divided into lubricant-containing halves 74, 74 on opposite sides of the track rail 2. The lubricant-containing halves 74, 74, assembled in the case 46, are arranged spaced apart from one another with the middle area 50 in the case 46. The lubricant-containing halves 74, 74 are held in the case 46 in such a relation that they are isolated from each other and confined by the upper horizontal section 47 with the middle area 50, side sections 48 and lower horizontal sections 49. As an alternative, the lubricant-containing member 73 may be formed in an integral construction of the inverted U-shape, provided that there is no need of the opening 58 for the grease nipple. The case 46 surrounds the lubricant-containing halves 74, 74, respectively, to hold steadily them therein. Moreover, the case 46, when mounted to the slider 1 encloses most periphery of the lubricant-containing member 73 to shield the member 73 against debris and breakage and prevent the leakage of the lubricant. Each of the lubricant-containing halves 74, 74 is allowed to provide only as much volume as needed to lubricate the raceway grooves 4 and, therefore, the lubricant-containing member 73 may be made more compact in size.

As the lubricant-containing halves 74, 74 are arranged in symmetry on the opposite sides of the track rail 2, assembling the lubricant plate into the holder, therefore, may be completed by putting merely mass-produced lubricant-containing halves 74, 74 of the same pattern in the holder in such a fashion as to invert any one to the other with respect to the line V—V In this case, it is preferred that the case 46 is also is formed in symmetry with respect to the line V—V. This makes it possible to use any mould of the same pattern to produce the lubricant-containing halves 74, 74, resulting in the reduction in manufacturing cost of the lubricating means 45.

Windows 55, 56 are provided at the upper horizontal section 47 and the side sections 48 in the case 46 to offer much saving in material for producing the case 46 and also to make easy of the access to the lubricant-containing member 73. For example, the windows 55, 56 allow monitoring visually the lubricant-containing member 73. Moreover, after consumption of the lubricant, the lubricant-containing member 73 short of lubricant may be supplied with the lubricant through the windows 55, 56.

Although the lubricant-containing halves 74 each have a contour substantially complementary to the inward contour of the upper horizontal section 47, side sections 48 and lower horizontal sections 49 of the case 46, the lubricant-containing halves 74 are also provided with raised surfaces 75, 76 to fit in the windows 55, 56. Each raised surface 75, 76 has a height about half the depth of the associated window 55, 56 so that the lubricant-containing halves 74, when fitting in the case 46, do not jut out the outer surfaces of the case 46. Thus, the raised surfaces 75, 76 are to assure a reliable fit of the lubricant-containing halves 74 inside the case 46 whereby the lubricant-containing halves 74 are kept against falling off from the case 46, which might otherwise happen before attaching on the slider 1 or after detaching from the slider 1. Engaging the raised surfaces 75, 76 with the windows 55, 56 may be carried out with the elastic deformation of either both or any one of the lubricant-containing halves 74 and case 46, for example, by stretching somewhat the case 46 or compressing the lubricant-containing halves 74.

The lubricant-containing member 73, likewise with the lubricant-containing member 43 in the first embodiment, is comprised of a sintered resinous component of porous structure made of resins such as ultrahigh molecular weight polyethylene, and lubricant contained in voids of the porous structure, so that the previous description will be applicable. As to the composition of the lubricant for the lubricant-containing member 73, the lubricant in the first embodiment may be also employed with satisfaction so that the previous description will be also applicable.

Each lubricant-containing half 74 comes in sliding contact with the associated rolling applicator 70 held in the case 46 for rotation. The rolling applicators 70, or balls, are supported by bearing means 63 in the case 46 for rotation to transfer the lubricant from the lubricant-containing halves 74 onto the raceway grooves 4 of the track rail 2. The bearing means 63 are each composed of a pair of retainer arms 64 arranged spaced apart from each other in the direction of the thickness of the case 46, and an end plate 57 or a connecting web 65 extending from the end plate 57 along the back of the rolling applicators 70 to connected the retainer arms 64 with one another. The paired retainer arms 64 are arranged limited within the thickness of the case 46 and formed extended inward the case 46 from the end plate 57 and the distal end of the connecting web 65 so as to stretch into raceway grooves 4 on the track rail 2. The paired retainer arms 64 and the connecting web 65, in combination, provide a concavity 68 where the rolling applicator 70 is held for rotation in such a relation that it is partially exposed to the associated raceway groove 4 on the track rail 2. The retainer arms 34 stretch the extent where distal ends of the retainer arms 34 are slightly over the diametral plane of any rolling applicator 40. The retainer arms 34 terminate in claws 66 to embrace the rolling applicator 70 between them whereby the rolling applicator 40 is kept from falling off the paired retainer arms 64.

With the track rail 2 having mounted with the slider 1 together with the case 46 having the lubricant-containing member 73 and the rolling applicators 70, each rolling applicator 70 becomes kept against movement by means of the bearing mean 63 of the case 46 and the raceway grooves 4 of the track rail 2 excepting the revolution about any own axis to run through along the raceway groove 4 on the track rail 2. Each rolling applicator 70 comes in contact with any associated lubricant-containing half 74 at its about semi-spherical area excepting areas facing the retainer arms 64 and connecting web 65. Thus, as the slider 1 moves along the track rail 2, the rolling applicators 70 make revolution with keeping on sliding contact with the lubricant-containing halves 74 so that the lubricant held in the lubricant-containing halves 74 is incessantly transferred onto rolling applicators 70. Then, the lubricant on the rolling applicators 70 is applied little by little to the raceway grooves 4 on the track rail 2 in accordance with the sliding movement of the slider 1 along the track rail 2. The lubricant applied onto the raceway grooves 4 spreads therefrom over the rolling elements 7 and the raceway grooves 9 in the slider 1.

The lubricating means 45 may be mounted on the track rail 2 by any means that is preferred according to the operating condition. A prefabricated lubricating means 45 equipped with the case 46 having the built-in lubricant-containing member 73 may be mounted on the track rail 2 astride by simply somewhat stretching apart the side sections of the case 46. In contrast, if the lubricating means 45 must be spread apart too large for mounting on the track rail 2, it will be recommended to let the lubricant-containing member 73 fit on the track rail 2 from any lengthwise end of the track rail 2. Alternatively, it may be preferred to complete the lubricating means 45 by inserting each of the lubricant-containing halves 74 into the case 46 at every side of the opposite sides of the track rail 2.

Having described specific embodiments of the linear motion guide unit of the present invention, it is believed obvious that the invention may be practiced otherwise than as specifically described above.

The case 21 for the lubricating means 15, although having been described mounted on the slider 1 in the first embodiment, may be fixed to a mount that is connected to the slider 1 to move in unison with the slider 1. Instead of the matching holes 24 bored in the case 21, 46 and the opening 58 for the grease nipple 11, the case 21, 46 may be partially cut away to provide concavities to let the collared bolts or grease nipple 11 pass through. Moreover, washers of thin steel sheet may be alternatively arranged between the case 21 and the end cap 6 to keep both the case 21 and the end cap 6 against the deformation that might otherwise occur when squeezing the clamping bolts 25. In the embodiments described above, the rolling elements 7 is of balls and the raceway grooves 4 are formed in arced cross section in compliance with the balls. In contrast, in case where the rolling applicators 40 are of rollers, the lubricant-containing member 43 coming in contact with the rollers may be formed in a contour matching with any roller.

The linear motion guide unit of the present invention helps ensure the smooth sliding movement and also is suitable for the facilities where the escaped lubricant should be disposed without delay, such as clean rooms for semiconductor manufacturing machines where the operating environment should be prevented from the pollution with oil, food facilities where the oily material should be flushed away, and wood working facilities where dust absorbs oily material. The guide unit of the present invention may achieve good lubrication for long service life with maintenance-free except the replenishment of lubricant.

As an alternative, the lubricant-containing member 43, 73 may be varied locally in porosity in accordance with the areas in the lubricating means. For example, the areas coming in sliding contact with the rolling applicators 40, 70 are made rich in porosity, whereas the residual portions are made less in porosity. Thus, the lubricant flows easily from the porosity-less areas to the porosity-rich areas so that the lubricant may be transferred smoothly on the rolling applicators 40, 70. Moreover, the lubricant-containing member 73 may be shielded with a solid skin that is created by either fusing the surface areas of the lubricant-containing member 73 under high temperature or coating the member 73 with other resins, excepting the areas where the rolling applicators 70 make contact with the member 73 and other areas where the lubricant-containing member 73 is exposed to environment through the windows 55, 56 for replenishment of the lubricant to the member 73.

While the present invention has been described in its preferred embodiments, it is to be understood that the words which have been used are words of description rather than limitation and that changes within the purview of the appended claims may be made without departing from the true scope and spirit of the invention in its broader aspect.

What is claimed is:

1. A linear motion guide unit comprising a track rail provided at lengthwise side surfaces thereof with first raceway grooves, a sliding element movable with relative to the track rail and having second raceway grooves confronting the first raceway grooves, and lubricating means arranged on the sliding element for lubricating the confronting first and second raceway grooves, wherein the lubricating means is comprised of a case arranged riding the track rail astride, a lubricant-containing member accommodated in the case, and rolling applicators supported for free rotation by bearing means in the case in such a manner as to come in contact with the lubricant-containing member while run through the raceway grooves on the track rail, whereby the rolling applicators transfer the lubricant from the lubricant-containing member to the first and second raceway grooves, resulting in lubricating the first and scone raceway grooves, wherein the bearing means has a pair of retainer arms arranged spaced apart from each other in a direction of thickness of the case, and a web connecting the retainer arms to one another, and the rolling applicators are held for rotation in concavities, each of which is defined by the associated, paired retainer arms and connecting web.

2. A linear motion guide unit constructed as defined in claim 1, wherein the lubricating means is attached to any one of the sliding element and a mount that is fixed to the sliding element so as to move in unison with the sliding element.

3. A linear motion guide unit constructed as defined in claim 1, wherein the sliding element includes a casing having the second raceway grooves, rolling elements running between the confronting first and second raceway grooves, end caps attached to the opposite ends of the casing, and end seals arranged on the opposite ends of the case through connections to the end caps.

4. A linear motion guide unit constructed as defined in claim 1, wherein the case is formed in a container that contains the lubricant-containing member in a lower area therein while the lubricant in an upper area therein.

5. A linear motion guide unit constructed as defined in claim 4, wherein the container is made at a ceiling wall thereof with an admission port for replenishment of the lubricant and the admission port also allows the atmospheric air to flow in the container.

6. A linear motion guide unit constructed as defined in claim 1, wherein the lubricant is of lubricating oil mixed with any one selected from powdery resins, pulverized metals and felts.

7. A linear motion guide unit constructed as defined in claim 1, wherein the case is composed of a frame that comprises an upper section, side sections extending downward from sidewise opposing ends of the upper section, and lower sections extending towards the track rail from the bottom ends of the side section, and wherein the lubricant-containing member fits in the frame.

8. A linear motion guide unit constructed as defined in claim 7, wherein the case is provided with holes for any one of a grease nipple and a lubricant-supply coupling connected to the end caps.

9. A linear motion guide unit constructed as defined in claim 1, wherein the case is made of any one selected from metals, synthetic resins and synthetic rubbers.

10. A linear motion guide unit constructed as defined in claim 1, wherein the lubricant-containing member is made with concave surfaces where the rolling applicators come in sliding contact with the lubricant-containing member.

11. A linear motion guide unit constructed as defined in claim 1, wherein the lubricant is of any one of grease and lubricating oil.

12. A linear motion guide unit comprising a track rail provided at lengthwise side surfaces thereof with first raceway grooves, a sliding element movable with relative to the track rail and having second raceway grooves confronting the first raceway grooves, a plurality of rolling elements disposed between the sliding element and the track rail, and lubricating means arranged on the sliding element for lubricating the confronting first and second raceway grooves, wherein the lubricating means is comprised of a case attached to the sliding element and arranged riding the track rail astride, a lubricant-containing member accommodated in the case, and rolling applicators supported for free rotation by bearing means in the case in such a manner as to come in contact with the lubricant-containing member while run through the raceway grooves on the track rail, whereby the rolling applicators transfer the lubricant from the lubricant-containing member to the first and second raceway grooves, resulting in lubricating the first and second raceway grooves, wherein the lubricant-containing member is of a porous sintered resinous component that is produced by heating finely powdered synthetic resin of ultrahigh molecular weight polymers under pressure in a design mould.

* * * * *